United States Patent
Vargas et al.

(10) Patent No.: US 9,002,344 B2
(45) Date of Patent: Apr. 7, 2015

(54) PHONE CONTENT SERVICE

(75) Inventors: Sandra Vargas, Sammamish, WA (US); Peter Bernard, Bellevue, WA (US); Keith Rowe, Seattle, WA (US); Andrew Royal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 716 days.

(21) Appl. No.: 12/118,422

(22) Filed: May 9, 2008

(65) Prior Publication Data

US 2009/0197586 A1 Aug. 6, 2009

Related U.S. Application Data

(60) Provisional application No. 60/992,608, filed on Dec. 5, 2007.

(51) Int. Cl.
*H04M 3/00* (2006.01)
*H04W 64/00* (2009.01)

(52) U.S. Cl.
CPC .................................... *H04W 64/00* (2013.01)

(58) Field of Classification Search
CPC ..... H04L 67/1095; H04L 67/02; H04L 51/38; H04N 21/4307; G06Q 10/107; G06Q 10/10; A61B 5/0002; H04W 4/00; H04W 24/00; H04W 88/02
USPC ........... 455/419, 405, 418, 466, 404.2, 412.2, 455/414.1, 414.3, 426.1, 408, 420, 411, 455/412.1; 715/740, 204, 744, 752; 370/328, 232; 709/206, 223, 205, 225
See application file for complete search history.

(56) References Cited

U.S. PATENT DOCUMENTS

| | | |
|---|---|---|
| 5,402,474 A | 3/1995 | Miller |
| 5,898,161 A | 4/1999 | DeVita et al. |
| 6,112,206 A | 8/2000 | Morris |
| 6,282,275 B1 | 8/2001 | Gurbani |
| 6,606,663 B1 | 8/2003 | Liao |
| 6,662,023 B1 | 12/2003 | Helle |
| 6,696,941 B2 | 2/2004 | Baker |
| 6,785,935 B2 | 9/2004 | Ahn |

(Continued)

FOREIGN PATENT DOCUMENTS

| | | |
|---|---|---|
| EP | 1220556 | 7/2002 |
| EP | 1881680 | 1/2008 |

(Continued)

OTHER PUBLICATIONS

Slocombe, MobileKeeper: Mobile Phone Data Backup Over the Air, http://digital-lifestyles.info/2005/02/11/mobilekeeper-mobile-phone-data-backup-over-the-air/, 1-8.

(Continued)

*Primary Examiner* — Fred Casca
(74) *Attorney, Agent, or Firm* — Brian Haslam; Mike Allen; Micky Minhas

(57) ABSTRACT

A phone content service is described. In embodiment(s), content that is associated with a mobile phone can be stored by a phone content service that is accessible by a computer via a data communication network. An update to the content that is associated with the mobile phone can be received and updated at the phone content service. Updated content can then be synchronized with the mobile phone via a mobile communication network.

20 Claims, 6 Drawing Sheets

(56) References Cited

U.S. PATENT DOCUMENTS

| | | | |
|---|---|---|---|
| 6,850,226 | B2 | 2/2005 | Finke-Anlauff |
| 7,047,426 | B1 | 5/2006 | Andrews |
| 7,054,624 | B2 | 5/2006 | Cocita |
| 7,088,805 | B1 | 8/2006 | Moore |
| 7,092,247 | B2 | 8/2006 | Kim |
| 7,099,699 | B2 | 8/2006 | Jeong |
| 7,133,707 | B1 | 11/2006 | Rak |
| 7,184,750 | B2 | 2/2007 | Tervo |
| 7,252,511 | B2 | 8/2007 | Santos |
| 7,280,817 | B2 | 10/2007 | Comp |
| 7,319,865 | B2 | 1/2008 | Henrick |
| 7,369,868 | B2 | 5/2008 | Dunko et al. |
| 7,672,978 | B2 * | 3/2010 | Lehtola et al. ............ 707/999.2 |
| 2001/0006587 | A1 | 7/2001 | Keinonen et al. |
| 2002/0072395 | A1 | 6/2002 | Miramontes |
| 2003/0119543 | A1 | 6/2003 | Kfoury |
| 2004/0110488 | A1 | 6/2004 | Komsi |
| 2004/0121784 | A1 | 6/2004 | Park et al. |
| 2005/0002158 | A1 | 1/2005 | Olodort |
| 2005/0044235 | A1 | 2/2005 | Balahura et al. |
| 2005/0168446 | A1 | 8/2005 | Majdoub |
| 2005/0186954 | A1 | 8/2005 | Kenney |
| 2005/0186996 | A1 | 8/2005 | Pan |
| 2005/0188330 | A1 | 8/2005 | Griffin |
| 2005/0190281 | A1 | 9/2005 | Lee |
| 2005/0235070 | A1 | 10/2005 | Young et al. |
| 2005/0277428 | A1 | 12/2005 | Nathan Brown |
| 2006/0014517 | A1 | 1/2006 | Barclay et al. |
| 2006/0026304 | A1 * | 2/2006 | Price ............................ 710/8 |
| 2006/0105816 | A1 | 5/2006 | Hwang et al. |
| 2006/0135226 | A1 | 6/2006 | Won |
| 2006/0145839 | A1 | 7/2006 | Sandage |
| 2006/0148544 | A1 | 7/2006 | Kim |
| 2006/0161628 | A1 | 7/2006 | Nagy et al. |
| 2006/0165463 | A1 | 7/2006 | Katz |
| 2006/0176660 | A1 | 8/2006 | Amiri |
| 2006/0211459 | A1 | 9/2006 | Kubo |
| 2006/0224945 | A1 | 10/2006 | Khan et al. |
| 2006/0270445 | A1 | 11/2006 | Mlramontes |
| 2006/0274683 | A1 | 12/2006 | Koch et al. |
| 2007/0021112 | A1 | 1/2007 | Byrne |
| 2007/0021148 | A1 | 1/2007 | Mahini |
| 2007/0030249 | A1 | 2/2007 | Griffin et al. |
| 2007/0093281 | A1 | 4/2007 | Park et al. |
| 2007/0124685 | A1 * | 5/2007 | Guillermo et al. ............ 715/740 |
| 2007/0142101 | A1 | 6/2007 | Seshagiri |
| 2007/0153452 | A1 | 7/2007 | Harmon |
| 2007/0153465 | A1 | 7/2007 | Shih |
| 2007/0155400 | A1 | 7/2007 | Madsen |
| 2007/0219708 | A1 | 9/2007 | Brasche |
| 2007/0250711 | A1 | 10/2007 | Storey |
| 2007/0287512 | A1 | 12/2007 | Kilpi |
| 2007/0299681 | A1 * | 12/2007 | Plastina et al. .................... 705/1 |
| 2008/0114541 | A1 | 5/2008 | Shintani et al. |
| 2008/0168366 | A1 | 7/2008 | Kocienda et al. |
| 2009/0064055 | A1 * | 3/2009 | Chaudhri et al. ............ 715/863 |
| 2009/0129371 | A1 | 5/2009 | Bishay |
| 2009/0149192 | A1 | 6/2009 | Vargas |
| 2009/0149204 | A1 | 6/2009 | Riley |
| 2009/0149214 | A1 | 6/2009 | Riley |
| 2009/0150764 | A1 * | 6/2009 | Farrell et al. .................. 715/234 |
| 2009/0158190 | A1 | 6/2009 | Higginson |
| 2009/0291673 | A1 | 11/2009 | Chauvigne et al. |
| 2010/0058193 | A1 | 3/2010 | Sherrard et al. |

FOREIGN PATENT DOCUMENTS

| | | |
|---|---|---|
| WO | WO-0174097 | 10/2001 |
| WO | WO03/007639 A | 1/2003 |
| WO | WO2006131132 | 12/2006 |

OTHER PUBLICATIONS

"Phone Number Amnesia", http://www.esato.com/news/article.php/id=1639, 1-2.

"Non-Final Office Action", U.S. Appl. No. 12/118,412, Nov. 7, 2013, 12 pages.

"Non-Final Office Action", U.S. Appl. No. 12/123,206, (Jan. 26, 2012), 13 pages.

"Non-Final Office Action", U.S. Appl. No. 12/123,318, (Dec. 1, 2011), 9 pages.

"Final Office Action", U.S. Appl. No. 12/123,290, (Dec. 7, 2011),17 pages.

"Final Office Action", U.S. Appl. No. 12/123,318, (Mar. 21, 2012),9 pages.

"Non-Final Office Action", U.S. Appl. No. 12/118,412, (4/16/212),18 pages.

"Non-Final Office Action", U.S. Appl. No. 12/123,290, (Mar. 15, 2012),22 pages.

"Final Office Action", U.S. Appl. No. 12/123,290, (Sep. 19, 2012), 20 pages.

"Final Office Action", U.S. Appl. No. 12/123,318, (Oct. 4, 2012), 12 pages.

"Non-Final Office Action", U.S. Appl. No. 12/123,206, (Aug. 28, 2012), 13 pages.

"Non-Final Office Action", U.S. Appl. No. 12/123,318, (Jul. 27, 2012), 9 pages.

"Final Office Action", U.S. Appl. No. 12/118,412, (Nov. 19, 2012), 24 pages.

"Final Office Action", U.S. Appl. No. 12/123,206, (Feb. 15, 2013), 17 pages.

"Non-Final Office Action", U.S. Appl. No. 12/118,412, Jul. 10, 2014, 24 pages.

"Brand New O2 XDA Trion 2MP/Wi-Fi/Windows/Bluetooth", Retrieved from http://cgi.ebay.in/BRAND-NEW-O2-XDA-TRION-2MP-Wi-Fi-Windows-Bluetooth__W0QQitemZ120211900065QQihZ002QQcategoryZ126374QQssPageNameZWDVWQQrdZ1QQcmdZViewItem on 1/24/08 4 pages.

"Detailed Technical Specifications of HTC TyTN II P4550 (HTC Kaiser 120)", Retrieved from <http://www.pdadb.net/index.php?m=specs&id=733&view=1> on 1/24/08, 2 pages.

"Final Office Action", U.S. Appl. No. 12/123,206, (Nov. 7, 2011),11 pages.

"Final Office Action", U.S. Appl. No. 12/123,318, (Aug. 9, 2011),8 pages.

"HTC PPC-6800 Smartphone", Retrieved from http://www.internetshopper.com/index.php?/sf-1/pid-43116196 on Jan. 28, 2008, 4 pages.

"I mate Ultimate 9202", Retrieved from http://www.imate.com/support/specs/SpecSheet_9502.pdf on Jan. 24, 2008, 2 pages.

"Mobile Phone Tracking", Retrieved from http://www.mindat.org/mobile_phone_tracking.php in Jan. 28, 2008, 2 pages.

"MOCO Secure Protecting the Privacy of Your Phone Data Lock, Wipe & Scream Back-Up & Restore", Retrived from http://www.moco.com.my/MOCO_Secure.pdf on Jan. 28, 2008, 20 pages.

"Nextel GPS Provides a Mobile Locator to Locate Lost Phones", Retrieved from http://www.pacifictel.com/satellite-GPS-broadband/GPS-phones/nextel-GPS.shtml on Jan. 28, 2008, 1 page.

"Nokia adds mobile phone lock to Mirapoint", Retrieved from http://www.techworld.com/mobility/news/index.cfm?newsid=9188 on Jan. 28, 2008, 1 page.

"Nokia N810", Retrieved from http://www.nseries.com/nseries/v3/media/sections/products/tech_specs/en-R1/tech_specs_n810_en_R1.html on Jan. 24, 2008, 4 pages.

"Nokia N90—Camera Phone Brilliance", Retrieved from http://www.pdastreet.com/articles/2005/12/2005-12-22-Review-Nokia-N90.html on Jan. 28, 2008, 6 pages.

"Nokia triple slider patent gives you QWERTY, T9 and dedicated multimedia keys", Retrieved From http://www.intomobile.com/2007/12/17/nokia-triple-slider-patent-gives-you-qwerty-t9-and-dedicated-multimedia-keys.html on Jan. 28, 2008, 15 pages.

"Non Final Office Action", U.S. Appl. No. 12/118,412, (Feb. 17, 2011),8 pages.

"Non-Final Office Action", U.S. Appl. No. 12/118,412, (Sep. 14, 2011),23 pages.

"Non-Final Office Action", U.S. Appl. No. 12/123,206, (Apr. 19, 2011),12 pages.

(56) References Cited

OTHER PUBLICATIONS

"Non-Final Office Action", U.S. Appl. No. 12/123,290, (Oct. 3, 2011),14 pages.
"Non-Final Office Action", U.S. Appl. No. 12/123,318, (May 24, 2011),10 pages.
"Nuance XT9Å? Mobile Interface :: Enabling text by any means", Retrieved from ftp://ftp.scansoft.com/nuance/datasheets/ds_xt9.pdf on Jan. 28, 2008, 2 pages.
"Samsung P110 (SGH-P110)", Retrieved from http://www.setphones.net/Samsung-P110.html on Jan. 28, 2008, 3 pages.
"The HTC Kaiser is finally here—HTC TyTN II launches in Europe!", Retrieved from http://www.intomobile.com/2007/08/28/the-htc-kaiser-is-finally-here-htc-tytn-ii-laucnhes-in-europe.html on Jan. 28, 2008, 14 pages.
"The HTC P4350", retrieved from http://www.htc.com/product/03-product_p4350.htm, on Jan. 28, 2008, 2 pages.
"T-Mobile Sidekick LX interactive demo", Retrieved from http://www.sidekick.com/lxdemo.asp on Jan. 28, 2008, 1 page.

\* cited by examiner

PHONE CONTENT SERVICE

RELATED APPLICATION

This application claims the benefit of a related U.S. Provisional Application Ser. No. 60/992,608 filed Dec. 5, 2007 entitled "Devices, Features, and Systems for Mobile Communications", to Vargas et al., which is incorporated by reference herein.

BACKGROUND

Mobile phones are common in our society and are increasingly used to store different types of information and data, such as phone numbers, personal information, business information, documents, pictures, and other types of data. Mobile phones typically have limited connectivity to a voice network for voice communications, and 'smart' phones for business may also be connected to a data network for Internet access.

Although mobile phones may be connected for voice communications and, optionally, connected for Internet access, much of the information and data stored on a cell phone, for example, is 'trapped' and easily lost when the phone becomes inoperable, lost, or a user simply wants to upgrade to a new phone. Some mobile phones provide for a USB connection to a computer so that the information and data stored on a cell phone can be backed-up to a computer or other local storage media. However, computer connectivity is typically proprietary and the information and data can only be restored to another identical phone with hardware connections and stand alone, proprietary software that the user may not have or use.

SUMMARY

This summary is provided to introduce simplified concepts of a phone content service. The simplified concepts are further described below in the Detailed Description. This summary is not intended to identify essential features of the claimed subject matter, nor is it intended for use in determining the scope of the claimed subject matter.

A phone content service is described. In embodiment(s), content that is associated with a mobile phone can be stored by a phone content service that is accessible by a computer via a data communication network. An update to the content that is associated with the mobile phone can be received and updated at the phone content service. Updated content can then be synchronized with the mobile phone via a mobile communication network.

In various embodiment(s), the content that is associated with a mobile phone can include configuration settings of the mobile phone, media content stored on the mobile phone, information associated with a user of the mobile phone, business or personal information, documents, and/or messaging content that has been received and/or communicated via the mobile phone. The phone content service can track and organize the messaging content that is received and/or communicated via the mobile phone, such as text messages and data associated with voice communications.

In other embodiment(s), a phone content service can receive a text message communicated to the mobile phone from another text-enabled device, communicate the text message to a computer via a data communication network, and receive a reply text message from the computer for communication to the other text-enabled device. The phone content service can also include a network space that is accessible via the computer to view and manage the messaging and media content that is associated with the mobile phone.

BRIEF DESCRIPTION OF THE DRAWINGS

Embodiments of a phone content service are described with reference to the following drawings. The same numbers are used throughout the drawings to reference like features and components.

DETAILED DESCRIPTION

Figure 1:
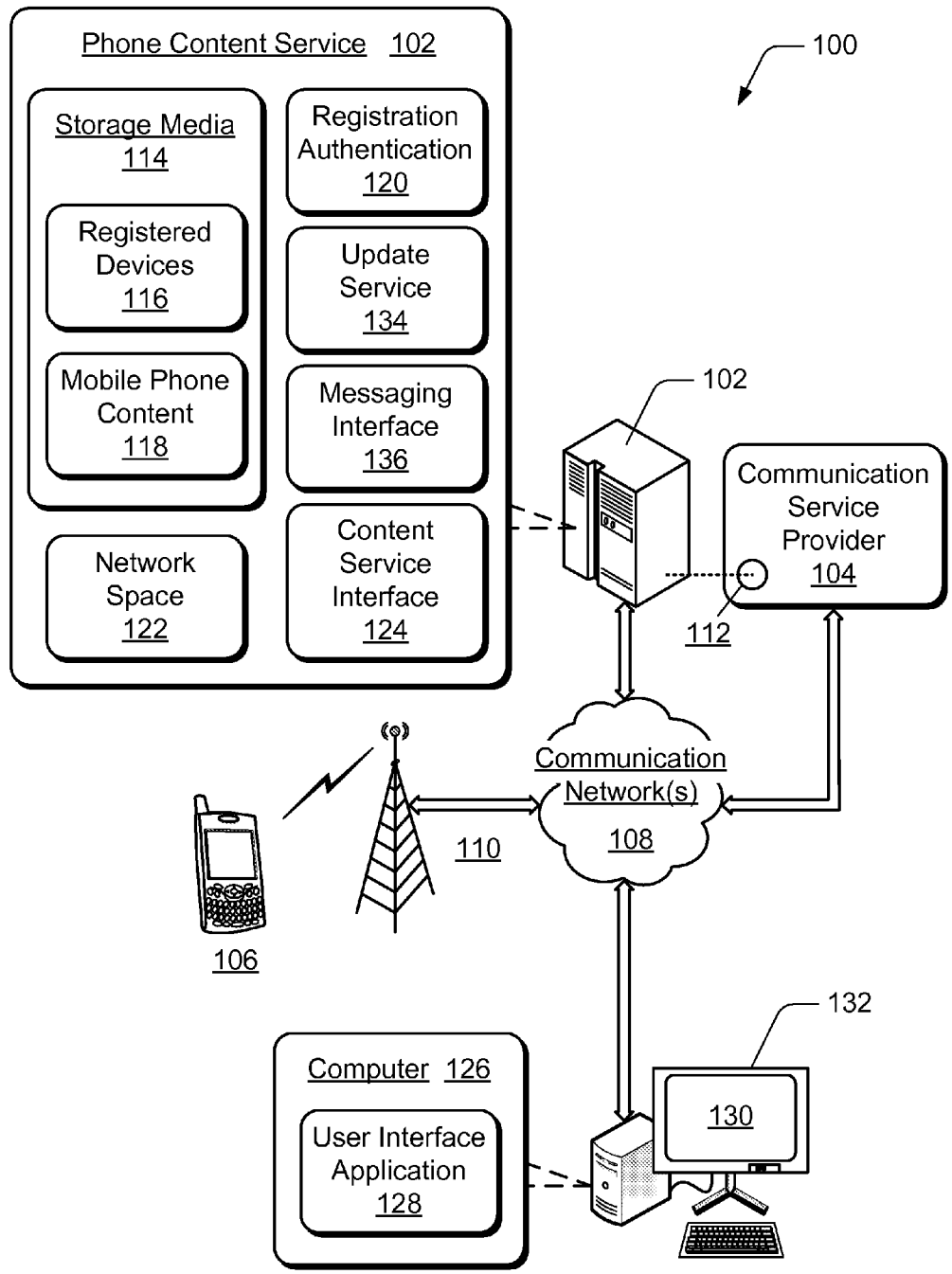
FIG. 1 illustrates an example system in which embodiments of a phone content service can be implemented.

Embodiments of a phone content service provide a network space by which to store, view, and manage all of the content that may be associated with a mobile phone, and the mobile phone is a cache of the content that is stored by the phone content service. The network space provides a network-based interface for a single, coherent view of the content that is associated with a mobile phone. A network space can also be associated with several media and/or communication devices, and maintain content that is associated with more than one of the devices, such as a mobile phone and a media playback device (e.g., a personal media player, portable music player, etc.).

The content can include any type of data and audio, video, or image content, such as configuration settings of the mobile phone, media content stored on the mobile phone, information associated with a user of the mobile phone, business or personal information, documents and/or messaging content that has been received and/or communicated via the mobile phone. The phone content service can also track and organize the messaging content that is received and/or communicated via the mobile phone, such as text messages and data associated with voice communications. The phone content service can also synchronize updated content with the mobile phone that is the cache of the content stored by the phone content service.

The phone content service includes a content service interface by which a user or owner of a mobile phone can access and interface the network space, such as via a wired or wireless computer for remote management and interaction with the mobile phone. In one or more embodiments, a user interface at a computing device can be implemented as a remote representation of the mobile phone itself, to include duplicating the actual interface shown displayed on the phone. From a phone content service user interface at a computer, the user or owner of the mobile phone can access the network space to view and manage the mobile phone content that is associated with the mobile phone and stored at the phone content service.

In addition, the user interface can also provide the user or owner of the mobile phone combined views of the mobile phone content, such as a list of favorites, the most recent activities, and photos that are all displayed in an aggregated view that would not otherwise fit on the interface display of the mobile phone device itself. The user of the mobile phone can also view the messaging content that is received and/or communicated via the mobile phone via the phone content service user interface at a computer.

The phone content service user interface also extends the functionality of a mobile phone to a computer for easier text messaging utilizing the computer keyboard, and to receive and initiate phone calls. For example, the phone content service can include a messaging interface to receive text messages that are communicated to a mobile phone from another text-enabled device. The messaging interface can initiate communication of the received text messages to a computer, and then receive a reply text message from the computer for communication back to the other text-enabled device that initiates the text communications.

While features and concepts of the described systems and methods for a phone content service can be implemented in any number of different environments, systems, and/or various configurations, embodiments of a phone content service are described in the context of the following example systems and environments.

FIG. 1 illustrates an example system 100 in which various embodiments of a phone content service can be implemented. In this example, system 100 includes a phone content service 102 and a communication service provider 104 that provides for mobile data and/or voice communications. For example, the communication service provider 104 may be a cell-phone provider, an Internet service provider, and/or a combination thereof. The communication service provider 104 enables data and/or voice communications for any type of a mobile device or mobile phone 106 (e.g., cellular, VoIP, WiFi, etc.), and/or any other wireless media or communication device that can receive data, voice, or media content in any form of audio, video, and/or image data.

A mobile device (e.g., to include mobile phone 106) can be implemented with one or more processors, communication components, memory components, and signal processing and control circuits. Further, a mobile device can be implemented with any number and combination of differing components as further described with reference to the example device shown in FIG. 6. A mobile device may also be associated with a user or owner (i.e., a person) and/or an entity that operates the device such that a mobile device describes logical devices that include users, software, and/or a combination of devices.

Communication network(s) 108 can be implemented to include any type of a data network, voice network, broadcast network, an IP-based network, and/or a wireless network 110 that facilitates data and/or voice communication between the phone content service 102, communication service provider 104, and mobile phone 106. The communication network(s) 108 can be implemented using any type of network topology and/or communication protocol, and can be represented or otherwise implemented as a combination of two or more networks. Any one or more of the arrowed communication links facilitate two-way data communication, such as from the phone content service 102 to the communication service provider 104 and vice-versa.

The phone content service 102 can be implemented as a subscription-based service to provide a network space by which to store and manage all of the content that may be associated with a mobile phone. The phone content service 102 can also be implemented as an independent or third-party service to implement the various embodiments of a phone content service as described herein. Alternatively, the phone content service 102 can be implemented as a component or service of the communication service provider at 112, and optionally, made available as a service or feature of a cell phone connection plan.

The phone content service 102 can also be implemented as several components or modules distributed to implement the various embodiments of a phone content service as described herein. The phone content service 102 can also be implemented as computer-executable instructions and executed by processor(s) to implement the various embodiments and/or features described herein. In addition, the phone content service 102 can be implemented with any number and combination of differing components as further described with reference to the example service shown in FIG. 5.

In the example system 100, the phone content service 102 includes storage media 114 to store or otherwise maintain various data and media content, such as a database of registered devices 116 and mobile phone content 118. The storage media 114 can be implemented as any type of memory, random access memory (RAM), a nonvolatile memory such as flash memory, read only memory (ROM), a removable storage device, and/or other suitable electronic data storage. The database of registered devices 116 can include an identifier of a mobile phone 106 that is registered with the phone content service 102 or registered via the communication service provider 104.

The phone content service 102 can also include a feature for registration authentication 120 to verify a particular mobile phone for synchronized content updates. A unique identifier can be established for a particular user having a link to a mobile phone 106 and/or a computer 126. The unique identifier can include any one or combination of a user identifier, a computer identifier, a phone identifier, a phone number, and any other identifier that can be utilized for registration authentication 120.

The mobile phone content 118 can include any type of data and audio, video, or image content, such as configuration settings of the mobile phone 106, media content stored on the mobile phone, information associated with a user of the mobile phone, business or personal information, documents, and/or messaging content that has been received and/or communicated via the mobile phone 106. Media content stored on the mobile phone 106 can include any type of audio, video, and/or image media content. In an embodiment, the phone content service 102 can track and organize messaging content that is received and/or communicated via the mobile phone 106, such as text messages and data associated with voice communications.

The phone content service 102 includes a network space 122 by which to manage various features of the mobile phone 106 as well as all of the mobile phone content 118 that may be associated with a mobile phone 106. The network space 122 provides a network-based interface for a single, coherent view of the content that is associated with mobile phone 106. The network space 122 can also be associated with several media and/or communication devices, and maintain the content 118 that is associated with more than one of the devices, such as a mobile phone and a media playback device (e.g., a personal media player, portable music player, etc.).

The phone content service 102 also includes a content service interface 124 which can be implemented as an interface to the network space 122 that can be accessed via a computer 126 for remote management and interaction with the mobile phone 106, such as to provide aggregated views on the mobile phone content 118 for the mobile phone 106. The network space 122 can be accessed by any wired or wireless desktop or laptop computer, or similar computing device that is networked to access the content service interface 124.

The computer 126 includes a user interface application 128 to display a phone content service user interface 130 on a display device 132 (e.g., an LCD or similar display device). A user or owner of the mobile phone 106 can then access the network space 122 to view and manage the mobile phone content 118 that is associated with the mobile phone 106. In one or more embodiments, the user interface 130 at a computing device can be implemented as a remote representation of the mobile phone itself, to include duplicating the actual interface shown displayed on the mobile phone 106. A user of the mobile phone 106 can also view the messaging content that is received and/or communicated via the mobile phone 106, and that has been tracked and organized at the phone content service 102 (e.g., as part of the mobile phone content 118).

The phone content service user interface 130 facilitates a user or owner of the mobile phone 106 managing and/or modifying the mobile phone content 118 that is associated with the mobile phone 106 at the phone content service 102. The user interface 130 can also provide the user or owner of the mobile phone 106 with combined views of the mobile phone content 118, such as a list of favorites, the most recent activities, and photos that are all displayed in an aggregated view that would not otherwise fit on the interface display of the mobile phone device itself. In addition, the user or owner of the mobile phone 106 can modify or update personalizations and configuration settings of the mobile phone from the computer 126. The personalizations and configuration settings may include themes, ring tones, display settings, application settings, alarm settings, and/or any other type of configuration settings of the mobile phone 106 (e.g., communicated as SMS or IP messages). A user at computer 126 can also drag-and-drop content to an identifier of the mobile phone 106 on the phone content service user interface 130, such as a picture that is dropped onto a representation of the mobile phone to set the background picture of the display on the mobile phone.

The content service interface 124 of the phone content service 102 can receive an update to the mobile phone content 118 that is associated with the mobile phone 106 via the computer 126 and a data communication network (e.g., the communication networks 108). The phone content service 102 also includes an update service 134 to then synchronize content updates with the mobile phone 106 via a mobile communication network (e.g., the wireless network 110). For example, media content for the mobile phone 106, such as music, videos, ringtones, and applications can be initiated for purchase or update at the computer 126 from various network-based distributors of the media content. The purchased media content can be stored at the phone content service 102 (e.g., as mobile phone content 118) and then initiated for communication to the mobile phone 106 by the update service 134 that synchronizes the mobile phone content 118 with the mobile phone.

The phone content service user interface 130 also extends the functionality of the mobile phone 106 to the computer 126 for easier text messaging utilizing the computer keyboard, and to receive and initiate phone calls, set alarms, change themes, ring-tones, and any other device settings and/or features. The phone content service 102 includes a messaging interface 136 to receive a text message communicated to the mobile phone 106 from another text-enabled device. The messaging interface 136 can initiate communication of the received text message to the computer 126 via the communication networks 108, and then receive a reply text message from the computer 126 for communication back to the other text-enabled device. In an embodiment, the communication service provider 104 provides the integration between the various data and voice communication networks.

Figure 2:
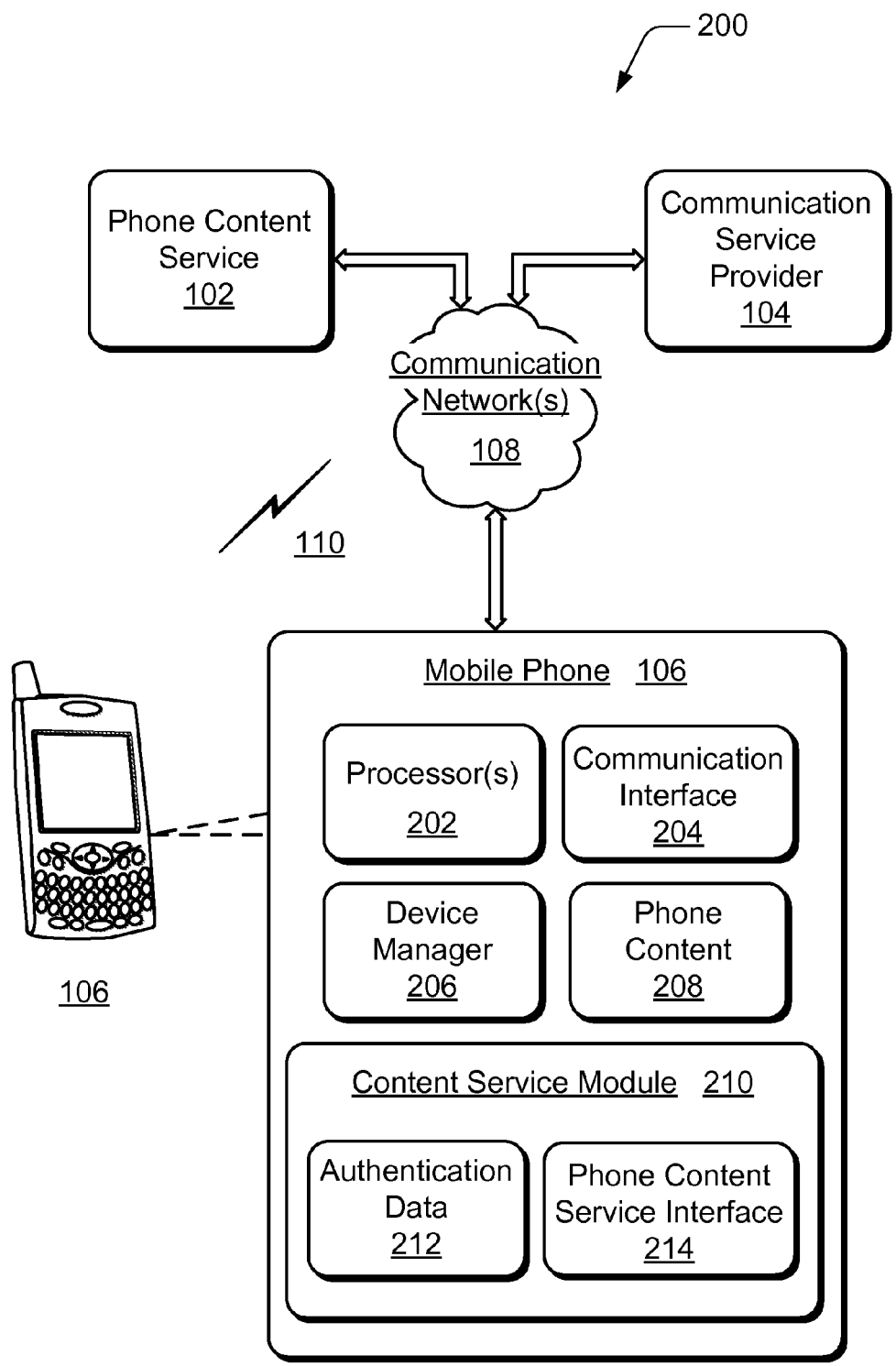
FIG. 2 illustrates another example system in which embodiments of a phone content service can be implemented.

FIG. 2 illustrates an example system 200 in which various embodiments of a phone content service can be implemented. In this example, system 200 includes the phone content service 102, communication service provider 104, and a mobile phone 106 as described with reference to FIG. 1. The phone content service 102, communication service provider 104, and mobile phones (e.g., mobile phone 106) can all be implemented for communication with each other via the communication network(s) 108 and/or the wireless network 110.

In this example, the mobile phone 106 includes one or more processors 202 (e.g., any of microprocessors, controllers, and the like), a communication interface 204 to receive and/or communicate data and voice communications, and a device manager 206 (e.g., a control application, software application, signal processing and control module, etc.). The mobile phone 106 also includes phone content 208, such as configuration settings of the mobile phone, media content stored on the mobile phone, information associated with a user of the mobile phone (e.g., user profile data that can be communicated to the phone content service 102), business or personal information, documents, and/or messaging content that has been received and/or communicated via the mobile phone. Media content stored on the mobile phone 106 can include any type of data and audio, video, and/or image media content.

In this example, the mobile phone 106 includes a content service module 210 that can be implemented as computer-executable instructions and executed by the processors 202 to implement various embodiments and/or features of a phone content service. The device manager 206 can interface with the content service module 210 to initiate communication with the phone content service 102 and/or the communication service provider 104 (e.g., via the communication interface 204).

The content service module 210 can include authentication data 212 that authenticates the mobile phone 106 with the phone content service 102. The content service module 210 also includes a phone content service interface 214 that interfaces the mobile phone 106 with the phone content service 102 (e.g., via the communication interface 204). The phone content service interface 214 can be implemented to facilitate synchronizing the content service module 210 of the mobile phone 106 with the phone content service 102 to communicate and receive updated phone content (e.g., updated mobile phone content 118 and/or 208).

Example methods 300 and 400 are described with reference to respective FIGS. 3 and 4 in accordance with one or more embodiments of a phone content service. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 300 and 400 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
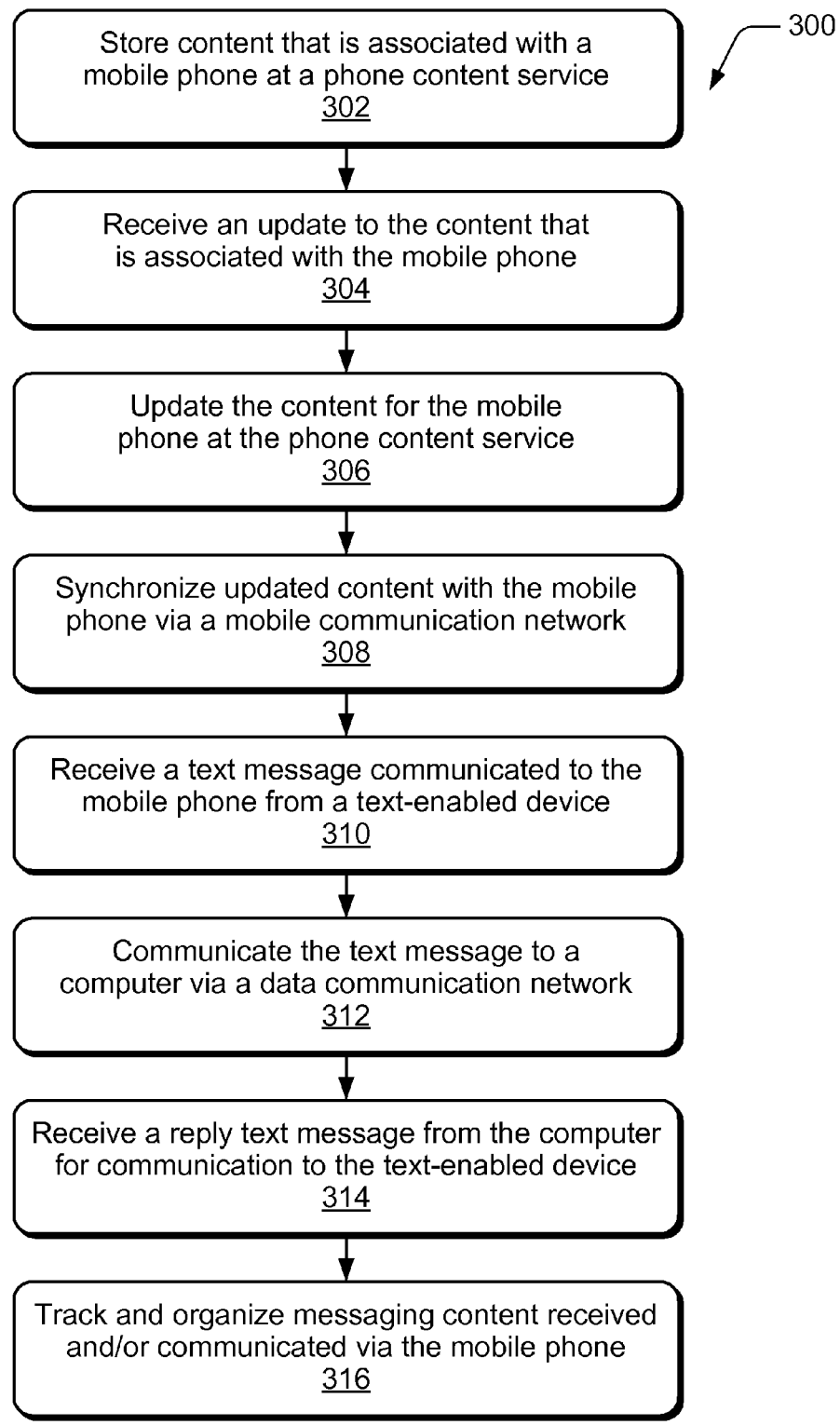
FIG. 3 illustrates example method(s) for a phone content service in accordance with one or more embodiments.

FIG. 3 illustrates example method(s) 300 of a phone content service, and is described with reference to the phone content service shown in FIG. 1. The order in which the method is described is not intended to be construed as a limitation, and any number of the described method blocks can be combined in any order to implement the method, or an alternate method.

At block 302, content that is associated with a mobile phone is stored at a phone content service. For example, the phone content service 102 (FIG. 1) stores mobile phone content 118 that is associated with mobile phone 106. The mobile phone content 118 can include any type of configuration settings of the mobile phone 106, media content stored on the mobile phone, purchased media content, information associated with a user of the mobile phone, business or personal information, documents, and/or messaging content that has been received and/or communicated via the mobile phone 106. The mobile phone content 118 stored by the phone content service is accessible by the computer 126 via a data communication network (e.g., the communication network 108).

At block 304, an update to the content that is associated with the mobile phone is received and, at block 306, the content for the mobile phone is updated at the phone content service. For example, the phone content service 102 can receive an update to the mobile phone content 118, such as via the computer 126 when a user of the mobile phone 106 initiates an update or purchase of media content for the mobile phone. Purchased media content can include music, videos, ringtones, and applications that are stored at the phone content service 102 (e.g., as an update to the mobile phone content 118). The phone content service 102 can also receive an update to a configuration setting of the mobile phone or an update to the information associated with the user of the mobile phone via the computer 126, such as when the user initiates the change.

At block 308, updated content is synchronized with the mobile phone via a mobile communication network. For example, the update service 134 at the phone content service 102 synchronizes updated content (e.g., updated mobile phone content 118) with the mobile phone 106. The mobile phone 106 is a cache of the content that is stored by the phone content service.

At block 310, a text message communicated to the mobile phone from a text-enabled device is received, and at block 312, the text message is communicated to a computer. For example, the messaging interface 136 at the phone content service 102 receives a text message communicated to the mobile phone 106 from another text-enabled device, and initiates communication of the received text message to the computer 126 via the communication networks 108. At block 314, a reply text message is received from the computer for communication to the text-enabled device. For example, the messaging interface 136 receives a reply text message from the computer 126 for communication back to the other text-enabled device.

At block 316, messaging content that is received and/or communicated via the mobile phone is tracked and organized. For example, the phone content service 102 tracks and organizes messaging content that is received and/or communicated via the mobile phone 106, such as text messages and data associated with voice communications.

Figure 4:
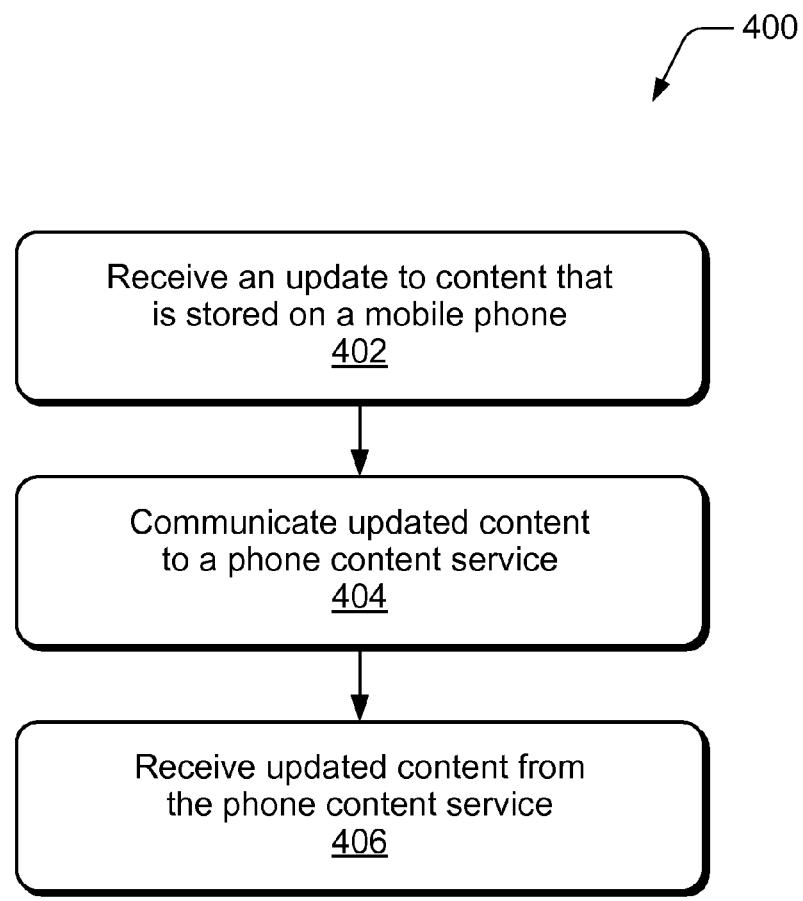
FIG. 4 illustrates example method(s) for a phone content service in accordance with one or more embodiments.

FIG. 4 illustrates example method(s) 400 of a phone content service, and is described with reference to a mobile phone. The order in which the method is described is not intended to be construed as a limitation, and any number of the described method blocks can be combined in any order to implement the method, or an alternate method.

At block 402, an update to content that is stored on a mobile phone is received. For example, a mobile phone 106 (FIG. 2) receives a content update, such as a configuration setting change, a change to the information associated with a user of the mobile phone, an update to application data, or a personalization change when a user initiates the change via a settings menu on the mobile phone.

At block 404, updated content is communicated to a phone content service. For example, the content service module 210 at the mobile phone 106 synchronizes to communicate the updated content to the phone content service 102 that stores the mobile phone content 118 that is associated with the mobile phone 106.

At block 406, updated content is received from the phone content service. For example, the mobile phone 106 receives updated content from the phone content service 102 when the phone content service receives an update to the mobile phone content 118 that is associated with the mobile phone 106.

Figure 5:
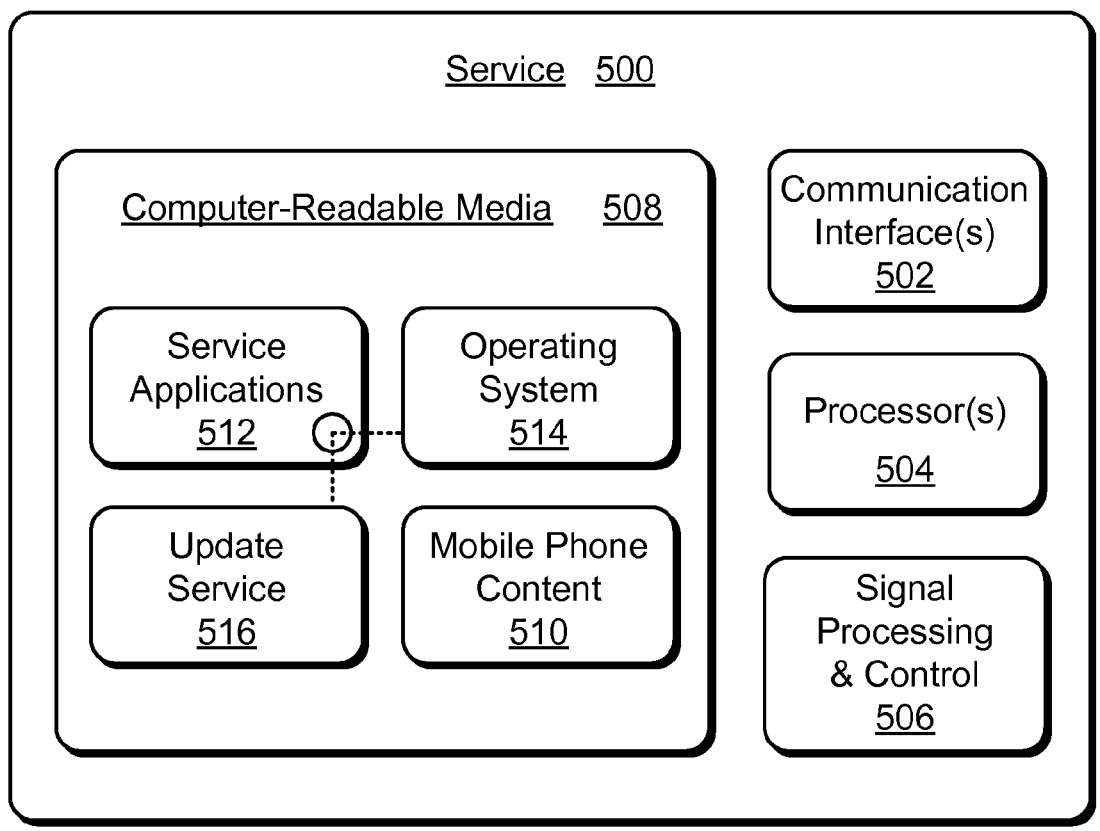
FIG. 5 illustrates various components of an example service that can implement embodiments of a phone content service.

FIG. 5 illustrates various components of an example service 500 that can implement various embodiments of a phone content service, such as shown in FIG. 1. Service 500 can include one or more communication interfaces 502 that can be implemented as any one or more of a serial and/or parallel interface, a wireless interface, any type of network interface, a modem, and as any other type of communication interface for data and/or voice communication. The communication interfaces 502 provide a connection and/or communication links between service 500 and communication network(s) by which other communication, electronic, and computing devices can communicate with service 500.

Service 500 can include one or more processors 504 (e.g., any of microprocessors, controllers, and the like) which process various computer-executable instructions to control the operation of service 500 and to implement embodiments of a phone content service. Alternatively or in addition, service 500 can be implemented with any one or combination of hardware, firmware, or fixed logic circuitry that is implemented in connection with signal processing and control circuits generally identified at 506.

Service 500 can also include computer-readable media 508, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 508 provides data storage mechanisms to store various types of information and/or data related to operational aspects of service 500, such as mobile phone content 510, and provides storage for various service applications 512. For example, an operating system 514 can be maintained as a computer application with the computer-readable media 508 and executed on the processors 504. The service applications 512 can also include an update service 516. In this example, the service applications 512 are shown as software modules and/or computer applications that can implement various embodiments of a phone content service.

Although not shown, service 500 can include a system bus or data transfer system that couples the various components within the service. A system bus can include any one or combination of different bus structures, such as a memory bus or memory controller, a peripheral bus, a universal serial bus, and/or a processor or local bus that utilizes any of a variety of bus architectures.

Figure 6:
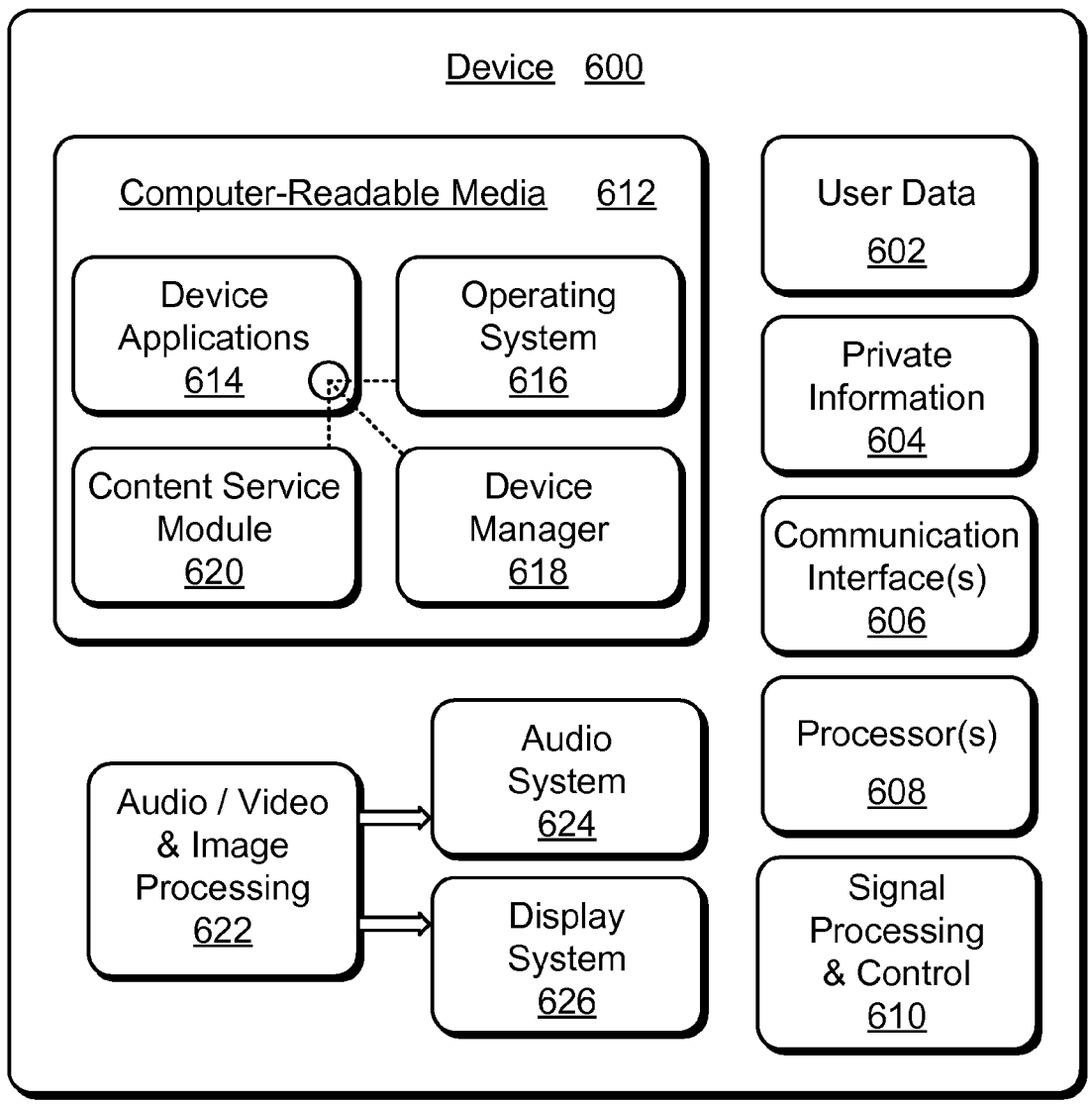
FIG. 6 illustrates various components of an example device that can implement embodiments of a phone content service.

FIG. 6 illustrates various components of an example device 600 that can be implemented as any form of a mobile communication, computing, electronic, and/or media device to implement various embodiments of phone content service. For example, device 600 can be implemented as a mobile phone or computer device as shown in FIG. 1 and/or FIG. 2. In various embodiments, device 600 can be implemented as any one or combination of a wireless or mobile phone, a portable computer device, and/or as any other type of mobile device that may be implemented for data and/or voice communication.

Device 600 can include user data 602, such as personal information associated with an owner of the device, and can include private information 604, such as phone numbers, documents, and/or any other personal or business related information that may be stored on the device. Device 600 further includes one or more communication interfaces 606 that can be implemented for any type of data and/or voice communication.

Device 600 can include one or more processors 608 (e.g., any of microprocessors, controllers, and the like) which process various computer-executable instructions to control the operation of device 600 and to implement embodiments of phone content service. Alternatively or in addition, device 600 can be implemented with any one or combination of hardware, firmware, or fixed logic circuitry that is implemented in connection with signal processing and control circuits which are generally identified at 610.

Device 600 can also include computer-readable media 612, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 612 provides data storage mechanisms to store the user data 602 and the private information 604, as well as various device applications 614 and any other types of information and/or data related to operational aspects of device 600. For example, an operating system 616 can be maintained as a computer application with the computer-readable media 612 and executed on the processors 608. The device applications 614 can also include a device manager 618 and a content service module 620. In this example, the device applications 614 are shown as software modules and/or computer applications that can implement various embodiments of phone content service.

Device 600 can also include an audio, video, and/or image processing system 622 that provides audio data to an audio rendering system 624 and/or provides video or image data to a display system 626. The audio rendering system 624 and/or the display system 626 can include any devices or components that process, display, and/or otherwise render audio, video, and image data. The audio rendering system 624 and/or the display system 626 can be implemented as integrated components of the example device 600.

Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of a phone content service have been described in language specific to features and/or methods, it is to be understood that the subject of the appended claims is not necessarily limited to the specific features or methods described. Rather, the specific features and methods are disclosed as example implementations of a phone content service.

The invention claimed is:

1. A method, comprising:
    storing content that is associated with a mobile phone, the content being stored by a phone content service that is accessible by a computer via a data communication network to implement a remote representation of the mobile phone for viewing and managing the content that is associated with the mobile phone, the remote representation including a duplication of a display interface of the mobile phone and enabling a user to drag-and-drop items of content to the remote representation for synchronization with the mobile phone via a mobile communication network;
    responsive to receiving an update to the content that is associated with the mobile phone, updating the content for the mobile phone at the phone content service and synchronizing updated content to a cache memory of the mobile phone via the mobile communication network; and
    responsive to a user request to view, manage, or play the updated content on the computer, causing the computer to present, enable management of, or play the updated content using the cache memory of the mobile phone and without accessing the phone content service.

2. A method as recited in claim 1, further comprising:
    receiving a text message communicated to the mobile phone from a text-enabled device, the text message being received by the phone content service;
    responsive to receiving the text message, the phone content service initiating communication of the text message to the computer via the data communication network; and
    receiving a reply text message for communication to the text-enabled device, the reply text message being received by the phone content service from the computer.

3. A method as recited in claim 1, further comprising:
    receiving purchased media content that is associated with the mobile phone, the purchased media content being stored by the phone content service; and
    communicating the purchased media content to the mobile phone when said synchronizing with the mobile phone.

4. A method as recited in claim 1, wherein receiving the update to the content includes receiving a configuration setting of the mobile phone, and wherein synchronizing the updated content includes communicating the configuration setting to the mobile phone.

5. A method as recited in claim 1, wherein the updated content is retrieved from the cache memory of the mobile phone through the data communication network.

6. A method as recited in claim 1, wherein the content that is associated with the mobile phone includes configuration settings of the mobile phone.

7. A method as recited in claim 1, wherein the content that is associated with the mobile phone includes media content stored on the mobile phone.

8. A method as recited in claim 1, wherein the content that is associated with the mobile phone includes information associated with a user of the mobile phone.

9. A method as recited in claim 1, wherein the content that is associated with the mobile phone includes messaging content that has been at least one of received or communicated via the mobile phone.

10. A method as recited in claim 9, further comprising tracking and organizing the messaging content.

11. A phone content service comprising:
one or more processors and one or more computer-readable storage memories comprising instructions that are executable by the phone content service to:
maintain content that is associated with a mobile phone;
provide an interface by which to receive an update to the content that is associated with the mobile phone, the interface being accessible by a computer via a data communication network as a remote representation of the mobile phone for viewing and managing the content that is associated with the mobile phone, the remote representation including a duplication of a display interface of the mobile phone and enabling a user to drag-and-drop items of content to the remote representation for synchronization to a cache memory of the mobile phone via a mobile communication network; and
provide an update service configured to synchronize content updates with the mobile phone via the mobile communication network, the synchronized content updates effective to enable the computer to present, enable management of, or play the updated content using the cache memory of the mobile phone and without accessing the phone content service.

12. A phone content service as recited in claim 11, the instructions further comprising providing a network space that is accessible via the computer to view and manage the content that is associated with the mobile phone.

13. A phone content service as recited in claim 11, the instructions further comprising providing a messaging interface configured to:
receive a text message communicated to the mobile phone from a text-enabled device;
responsive to receipt of the text message, initiate communication of the text message to the computer via the data communication network; and
receive a reply text message for communication to the text-enabled device, the reply text message being received from the computer.

14. A phone content service as recited in claim 11, wherein the content that is associated with the mobile phone includes configuration settings of the mobile phone, and wherein the update service is further configured to synchronize a configuration setting with the mobile phone.

15. A phone content service as recited in claim 11, wherein the content that is associated with the mobile phone includes media content stored on the mobile phone, and wherein the update service is further configured to synchronize the media content with the mobile phone.

16. A phone content service as recited in claim 11, wherein the content that is associated with the mobile phone includes information associated with a user of the mobile phone, and wherein the update service is further configured to synchronize the information with the mobile phone.

17. A phone content service as recited in claim 11, wherein the content that is associated with the mobile phone includes messaging content that has been at least one of received or communicated via the mobile phone.

18. A phone content service as recited in claim 17, wherein the update service is further configured to track and organize the messaging content, and wherein the interface is further configured to display an aggregated view of the messaging content and the content that is associated with the mobile phone.

19. A mobile phone, comprising:
a communication interface configured for data communication with a phone content service via a mobile communication network, the phone content service being accessible by a computer via a data communication network to implement a remote representation of the mobile phone and configured to maintain and update content that is associated with the mobile phone, the remote representation including a duplication of a display interface of the mobile phone and enabling a user to drag-and-drop items of content to the remote representation for synchronization with the mobile phone; and
a content service module configured to synchronize with the phone content service to receive updated content for the mobile phone; and
a cache memory configured to store the updated content, the cache memory accessible by a computer via a data communication network effective to enable the computer to present, enable management of, or play the updated content at the computer.

20. A mobile phone as recited in claim 19, wherein the content that is associated with the mobile phone includes at least one of configuration settings of the mobile phone, media content stored on the mobile phone, information associated with a user of the mobile phone, or messaging content that has been at least one of received or communicated via the mobile phone.

* * * * *